United States Patent

[11] 3,627,439

[72] Inventor Peter Gnoth
 Aldingen, Germany
[21] Appl. No. 813,674
[22] Filed Apr. 4, 1969
[45] Patented Dec. 14, 1971
[73] Assignee American Drill Bushing Company
 Los Angeles, Calif.
 Continuation-in-part of application Ser. No. 722,396, Apr. 18, 1968, now Patent No. 3,535,956. This application Apr. 4, 1969, Ser. No. 813,674

[54] DRILL JIG SLEEVE FOR EQUIPMENT
 9 Claims, 24 Drawing Figs.
[52] U.S. Cl. .................................................. 408/241
[51] Int. Cl. .................................................. B23b 49/02
[50] Field of Search ....................................... 77/62 B; 408/241

[56] References Cited
OTHER REFERENCES

Publication: American Machinist, Volume 54, No. 23, dated June 9, 1921, pages 997 and 998, article entitled "Tool Engineering," by Dowd et al. (FIG. 63)

*Primary Examiner*—Francis S. Husar
*Attorney*—Beehler & Arant

ABSTRACT: A guide sleeve for a twist drill, the guide sleeve being held in a drill block against rotation and also against movement axially of the sleeve. The sleeve has a cylindrical exterior. A stamping of relatively flat stock has a hole in one end encircling and fastened to the sleeve at the entrance end, as for example by welding, soldering or metal glue. Additionally, a portion of the stamping engages the surface of the drill block to space the entrance end from the drill block and a threaded stud in the drill block has a position spaced a short distance from the sleeve and engages a radially extending end of the stamping to prevent rotation of the sleeve when the drill is injected into it.

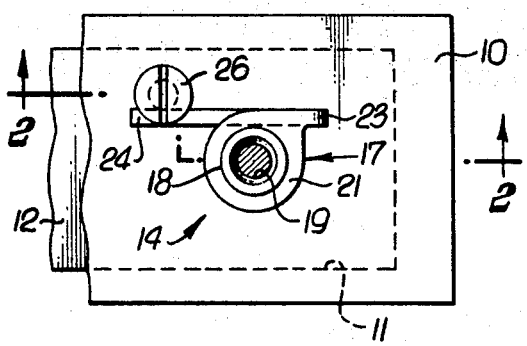
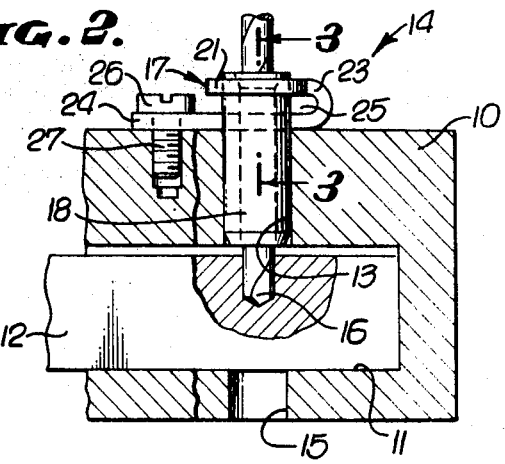
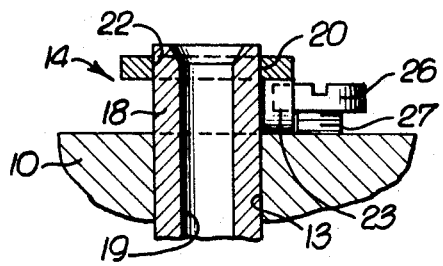
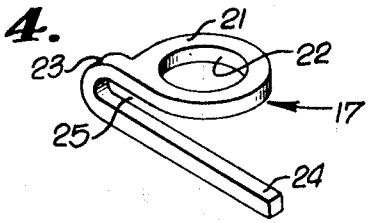
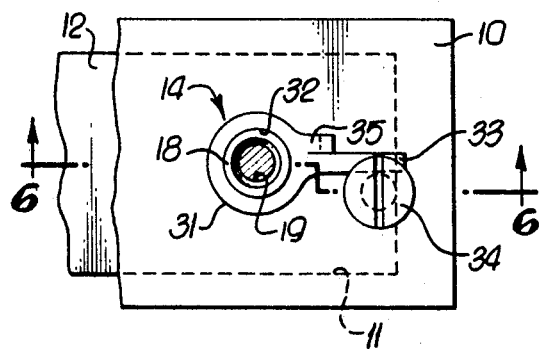
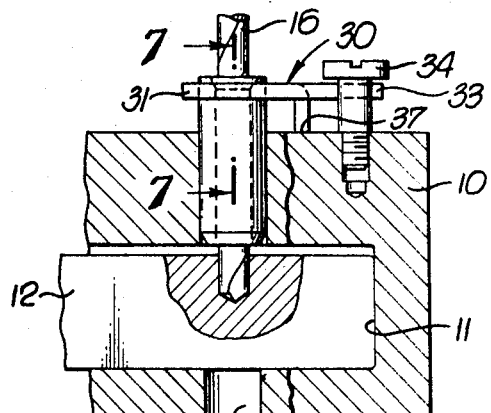
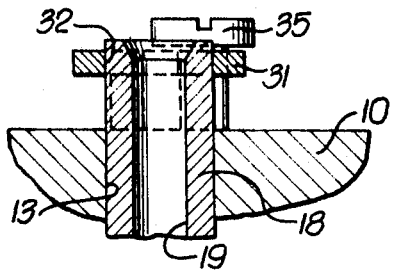
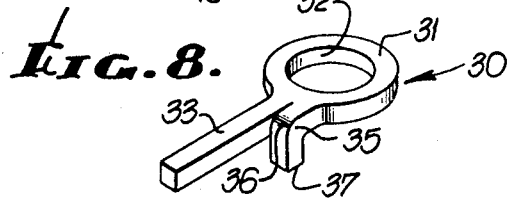
INVENTOR.
PETER GNOTH
BY Beehler & Arant
ATTORNEYS.

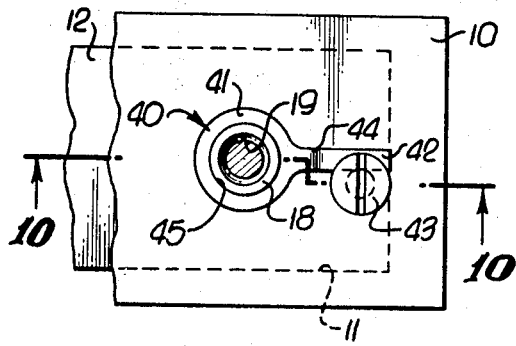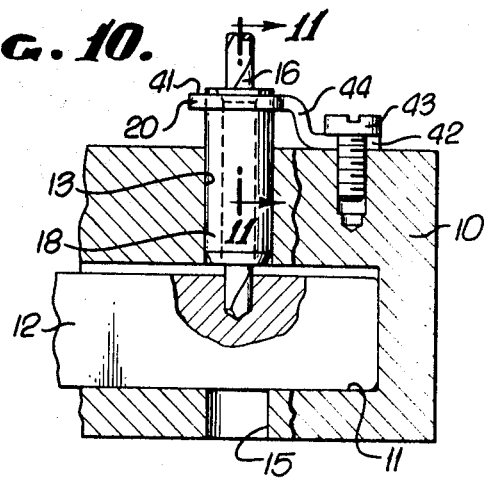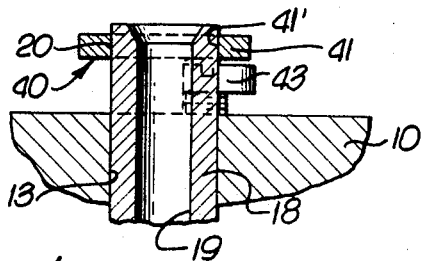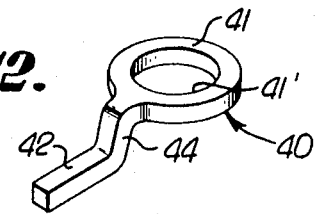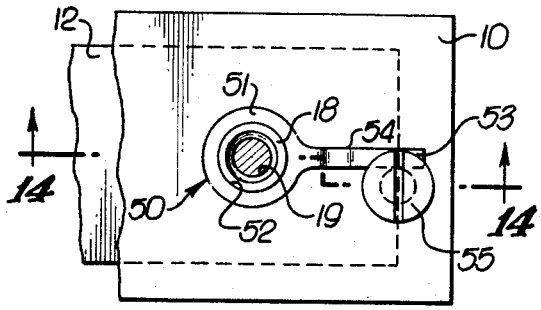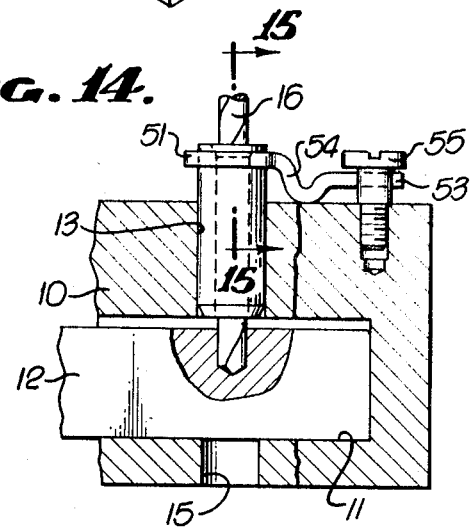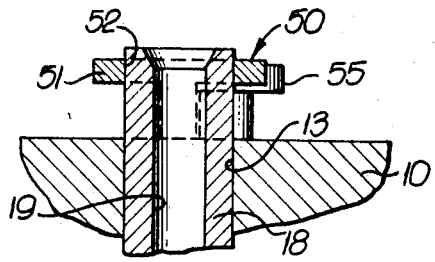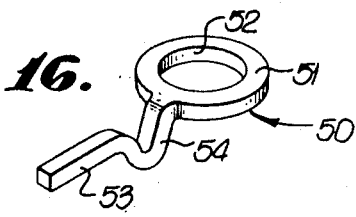

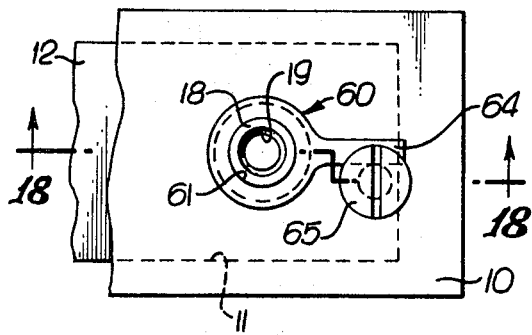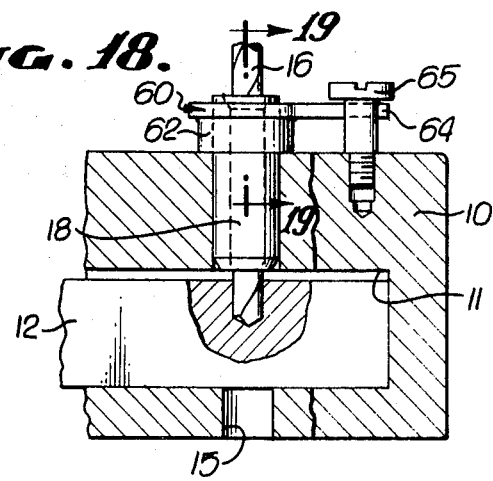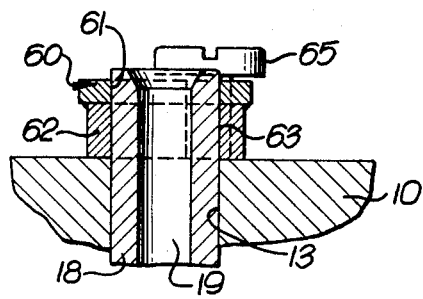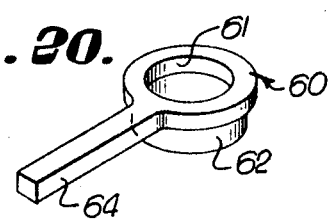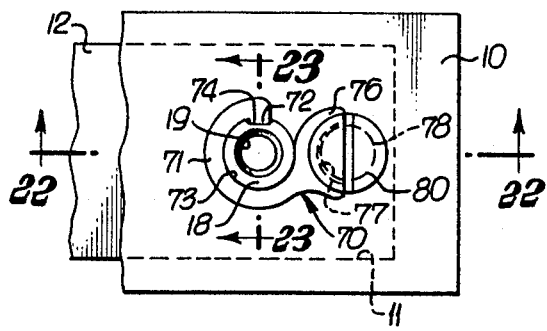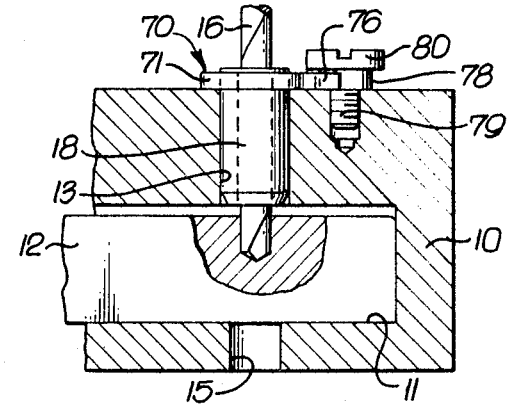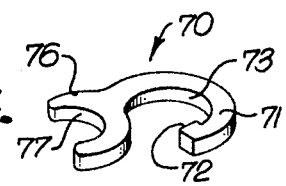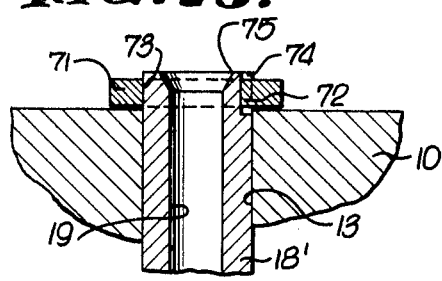
INVENTOR.
PETER GNOTH
BY Beehler & Arant
ATTORNEYS.

DRILL JIG SLEEVE FOR EQUIPMENT

This is a continuation-in-part of Ser. No. 722,396, filed Apr. 18, 1968, now U.S. Pat. No. 3,535,956.

Drill jig guide sleeves generally have long been in use for locating production drilling operations so that a hole drilled into a workpiece is drilled in the proper location. The sleeves are customarily of hardened metal to resist wear, and thus constructed are adapted to be used repeatedly for long periods before they require replacement. Customarily, the sleeves are provided with a head larger in diameter than the body of the sleeve thereby to limit endwise movement of the sleeve into the drill block when they have been fastened to the drill block in various ways, as for example by a threaded stud with a relatively large head adapted to overlie a shoulder on the sleeve. These threaded studs are intended to be removable so that the sleeve itself can be removed and replaced when worn or when, for example, a twist drill of different diameter might be needed.

Necessarily, when a sleeve having a head is employed, there is expense involved in the forming operation since usually the stock must be as large in diameter as the head and the stock then machined to a smaller diameter throughout that portion which is to be inserted in a bore in the drill block. Obviously, there is an excess of metal which must be paid for and disposed of and attendant machining operations which are costly to a degree.

Among the objects of the invention is to provide a new and improved drill jig guide sleeve which is relatively inexpensive in that simple, inexpensive forms of raw material are used, such for example as a tubular shaft and a sheet metal stamping assembled together in a form so as to serve as a drill jig guide sleeve.

Another object of the invention is to provide a new and improved drill jig guide sleeve wherein the usual head is omitted and wherein a formed member is substituted therefor, the formed member being deformed in such fashion as to serve the double purpose of inhibiting the sleeve against rotation and also preventing it from being shifted endwise in the drill block.

Still another object of the invention is to provide a new and improved drill jig guide sleeve which is so designed and constructed as to reduce to an appreciable extent the fabricating cost.

Also included among the objects of the invention is to provide a new and improved drill jig guide sleeve which, despite its inexpensive and simplified construction is a dependable and accurate tool accessory.

With these and other objects in view, the invention consists in the construction, arrangement, and combination of the various parts of the device, whereby the objects contemplated are attained, as hereinafter set forth, pointed out in the appended claims and illustrated in the accompanying drawings.

In the drawings:

FIG. 1 is a plan view of a drill block showing one form of the invention placed thereon.

FIG. 2 is a longitudinal sectional view on the line 2—2 of FIG. 1.

FIG. 3 is a fragmentary sectional view on the line 3—3 of FIG. 2.

FIG. 4 is a perspective view of the formed member.

FIG. 5 is a plan view of a second form of the invention in place in a drill block.

FIG 6 is a longitudinal sectional view on the line 6—6 of FIG. 5.

FIG. 7 is a fragmentary sectional view on the line 7—7 of FIG. 6.

FIG. 8 is a perspective view of another type of formed member of FIGS. 5 through 7.

FIG. 9 is a plan view of another form of the invention in place in a drill block.

FIG. 10 is a longitudinal sectional view on the line 10—10 of FIG. 9.

FIG. 11 is a fragmentary sectional view on the line 11—11 of FIG. 10.

FIG. 12 is a perspective view of the formed member of FIGS. 9 through 11.

FIG. 13 is a plan view of still another form of the invention placed in a drill block.

FIG. 14 is a longitudinal sectional view on the line 14—14 of FIG. 13.

FIG. 15 is a fragmentary sectional view on the line 15—15 of FIG. 14.

FIG. 16 is a perspective view of the formed member of FIGS. 13 through 15.

FIG. 17 is a plan view of another form of the device.

FIG. 18 is a longitudinal sectional view on the line 18—18 of FIG. 17.

FIG. 19 is a fragmentary longitudinal sectional view on the line 19—19 of FIG. 17.

FIG. 20 is a perspective view of the formed member of FIGS. 17, 18 and 19.

FIG. 21 is a plan view of still another modification in form of the invention.

FIG. 22 is a longitudinal sectional view on the line 22—22 of FIG. 21.

FIG. 23 is a fragmentary sectional view on the line 23—23 of FIG. 21.

FIG. 24 is a perspective view of the formed member of FIGS 21, 22 and 23.

In an embodiment of the invention chosen as a first form for illustration there is shown a drill block 10 provided with a positioning slot 11 in which is located a workpiece 12. In the drill block is a bore 13 adapted for reception of a drill jig guide sleeve assembly indicated generally by the reference character 14. A clearance hole 15 is in axial alignment with the bore 13 to accommodate a conventional twist drill 16 when it is driven through the workpiece 12.

The drill jig guide sleeve is made up into an assembly with a stamping member indicated generally by the reference character 17 and shown in perspective view in FIG. 4.

A drill jig guide sleeve member 18 is generally tubular in form and provided with a central axial passage 19 to accommodate the twist drill 16. Although the drill jig guide sleeve in the chosen embodiment is a right circular cylinder, it will be understood that the exterior circumference is not limited to a rounded or circular form but contemplates exterior forms of various shapes which are substantially uniform from end to end and devoid of protuberances.

Adjacent one end of the sleeve member 18 is an area 20 which customarily extends throughout the entire perimeter. A portion 21 of the stamping member 17 has a hole 22 adapted to receive the sleeve member 18 so as to positively encircle the sleeve member 18. To assure that there will not be any rotation between the drill jig guide sleeve and the stamping member, the stamping member is fastened to the sleeve by some means, such for example as metal glue, welding, or soldering, especially on those occasions where the sleeve is of rounded exterior rather than being of noncircular cross-sectional shape.

Further, although the member 17 has referred to as made from a sheet metal stamping, the object is primarily low cost and other metal forms may also be found acceptable.

In the form of device of FIGS. 1 through 4 inclusive, another portion 23 is bent around itself in a U-shape, a long leg 24 of which extends outwardly for a short distance in a direction substantially tangential to the sleeve member 18. A bend of substantially 180° provides a space 25 so that one side of the portion 24 engages an adjacent face of the drill block.

A threaded stud bolt 26 has a threaded shank 27 in threaded engagement with the drill block 10 and is preferably threaded into position fingertight. The stud bolt 26 is in such location that it has a position of engagement with the portion 24 of the stamping member and serves the double purpose of holding the stamping member 17 down against an upper face of the drill block and preventing rotation of the sleeve assembly when the twist drill 16 is operated in conjunction with it. Similarly, the stamping serves a double purpose in that the portion 24, by being brought into engagement with the adjacent face of the drill block, positions the sleeve member 18 with respect to the block in an axial direction, as determined by the space 25 at the 180° bend in the portion 23. Moreover, fastened as described the stamping member also prevents the sleeve from rotating during use.

In a second form of the invention illustrated in FIGS 5, 6, 7 and 8 a stamping member 30 has a slightly different form. In this instance a portion 31 has a hole 32 which encircles the sleeve member 18, but a portion 33 which extends outwardly from the sleeve is straight and engages a stud bolt 34 at a location spaced substantially from the adjacent face of the drill block 10. THe portion 31 moreover is at a location such that its axis is substantially in alignment with the axis of the sleeve member 18 rather than being in tangential relationship. A second outwardly extending portion 35 extends a short distance radially and then has a 90° bend 36 so that an end 37 can be brought into direct physical contact with the adjacent face of the drill block and in this way position the sleeve member 18 with respect to endwise movement relative to the drill block. In this instance also, some adhesive means such as metal glue, a weldment, or solder may be employed to anchor the stamping member 30 to the sleeve member 18.

In the form of invention of FIGS 9, 10, 11 and 12 a stamping member 40 has a portion 41 containing a hole 41' encircling the sleeve member 18 within the perimetral area 20 and a portion 42 extending in a radially outward direction into engagement with a stud bolt 43. In this instance, the portion 42 has an offset bend 44 connecting it to the portion 41. Bent as described, the portion 42 engages the adjacent surface of the drill block 10 and positions the sleeve member 18 endwise with respect to the drill block 10. At the same time, the end portion 42, by being brought against the side of the stud bolt 43, prevents rotation of the sleeve member 18 when in use.

As evidence of still an additional configuration which may be given to the formed member within the scope of the invention, there is shown in FIGS. 13, 14, 16 and 16 a stamping 50 having a portion 51 containing a hole 52 encircling the sleeve member 18 and a portion 53 extending radially as shown in fig. 13. The portion 53 includes a reverse loop 54 which extends in a direction parallel to the axis of the sleeve 18, so that it is adapted to engage the adjacent face of the drill block 10. The reverse loop 54 is of such configuration that the end of the portion 53 is at a location spaced from the adjacent face of the drill block 10 where it is brought into engagement with a stud bolt 55 to prevent rotation of the sleeve during use and by means of which additionally the sleeve member may be held within the bore 13 of the drill block in its selected position.

In the form of invention of FIGS. 17 through 20 there is a slightly modified formed member 60. In FIG. 17 for example, the formed member 60 has a hole 61 extending around the sleeve member 18 but there is additionally a spacing collar 62 which may be a separate piece soldered on or formed from the member 60 itself in an appropriate punching or stamping operation. An axially extending area 63 on the exterior of the sleeve member 18 lies within the hole 61 where it is fastened. The formed member 60 has a radially extending end portion 64 which is adapted to engage a stud bolt 65 in the usual way. In this form of the invention the collar 62 serves to limit axial shift of the sleeve member 18 with respect to the drill block 10. By spacing the entrance end of the sleeve member 18 from the drill block 10, there is provided a fixed renewable guide sleeve assembly of a readily usable sort.

In the form of invention of FIGS 21 through 24 an extremely simple flat stamping indicated generally by the reference character 70 is formed somewhat differently with respect to both the end portion 71 and the opposite end portion 76. In this form of the device, the end portion 71 is bent to form an endmost projection extending radially into a hole 73, the hole being open laterally adjacent the projection 72, an endwise open slot 74 is provided in the sleeve member 18', adjacent an entrance end 75, wherein the projection 72 can be anchored by appropriate means. The thickness of the stamping 70 determines the spacing of the entrance end from the drill block. In the end section 76 is an arcuate recess 77 adapted to partially receive a shank 78 of a stud bolt 79 at a location beneath the bolt head 80. Assembled in this fashion, the guide sleeve assembly can be dropped into the bore 18 and anchored against further rotational movement by application of the stud bolt 79. The guide sleeve assembly can be easily removed by first removing the stud bolt 79 to release the end portion 76 from its position anchored under the head of the stud bolt 79 and then merely lifted from the bore 13 to allow replacement with another guide sleeve assembly which may have for example, a central axial passage sized to fit a twist drill of different diameter, or perhaps a reaming tool.

It will be clear from the foregoing description of subject matter and assembly that inasmuch as the sleeve member 18 has a uniform exterior configuration, it can be made from tubular stock or bar stock of indefinite length with parts merely cut off to desired length. When an area like the perimetral area 20 is employed, the forming of it is a simple operation and virtually the only machining operation needed for the sleeve member 18. The other member of the assembly, namely the formed member in each instance, is a physical form of singularly inexpensive character and can be readily given its desired configuration by a simple stamping, pressing or molding operation and engaged with the sleeve by sliding it over the end. Accordingly, material cost is held substantially to a minimum and the forming and assembly operations are considerably simplified resulting in a drill jig guide sleeve assembly which is of low cost and of dependable construction.

Having described the invention, what is claimed as new in support of Letters Patent is:

1. A drill bushing guide assembly for releasable application to a drill block having a cylindrical bore therein, said assembly comprising a sleeve member having a bore therethrough with an entrance end and exit end for a drill bit, the exterior of said sleeve member being cylindrical in form from end to end of a diameter forming a close sliding fit in said bore, the diameter of all portions of the exterior of said sleeve member being no greater than the diameter forming the close sliding fit, a radial extension member for said sleeve member comprising a metal element of substantially flat stock having a hole therethrough of fixed diameter substantially equal to the exterior diameter of said sleeve member, said sleeve member being located in said hole and having a rotation inhibiting attachment to said extension member adjacent the entrance end of the sleeve member whereby to anchor the extension member against endwise and rotational movement relative to said sleeve member, a first portion of said extension member adjacent said entrance end being axially spaced from a second portion of said extension member facing said exit end, said second portion having an operative position in engagement with the drill block whereby to space the entrance end from the drill block, and an anchor element on the drill block spaced radially from said bore engageable with said extension member in a rotational direction whereby to prevent rotation of said sleeve member during operation.

2. A drill bushing guide assembly according to claim 1 wherein the extension is a relatively flat member having a thickness sufficient to provide the spacing of said entrance end from said drill block.

3. A drill bushing guide assembly for releasable application to a drill block having a cylindrical bore therein, said assembly comprising a sleeve having a bore therethrough with an entrance end and an exit end for a drill bit, the exterior of said sleeve being cylindrical in form from end to end and of a diameter forming a close sliding fit in said bore, a radial extension for said sleeve comprising a metal element of substantially flat stock having a hole therethrough of diameter substantially equal to the exterior diameter of said sleeve, said sleeve being located in said hole and having an attachment to said extension adjacent the entrance end of the sleeve whereby to anchor the extension against endwise and rotational movement relative to said sleeve, a first portion of said extension adjacent said entrance end being axially spaced from a second portion of said extension facing said exit end, said second portion having an operative position in engagement with the drill block whereby to space the entrance end from the drill block, and an anchor element on the drill block spaced radially from said bore engageable with said extension on a rotational direction whereby to prevent rotation of said sleeve during operation, the extension being a relatively flat member having a thickness sufficient to provide the spacing of said entrance end from said drill block, means forming a recess in the exterior of said sleeve and a projection on said extension secured in said recess comprising the attachment of said extension to said sleeve, said extension having a recess for reception of said anchor element.

4. A drill bushing guide assembly as in claim 1 wherein said extension has the form of a U-shaped curve with a long leg of the U-shaped curve in engagement with the block and the anchor element.

5. A drill bushing guide assembly as in claim 1 wherein said extension comprises a pair of adjacent parallel longer and shorter elements, said shorter element being bent to substantially a right angle with the face end thereof adapted to engage the drill block and the longer element being adapted to engage said anchor element.

6. A drill bushing guide assembly as in claim 1 wherein said extension has a bend intermediate the portion with the hole and a free end, the bend being in a direction substantially endwise with respect to the sleeve whereby to offset the free end of the extension relative to the other end and space said exit end from the drill block.

7. A drill bushing guide assembly as in claim 6 wherein the free end is in engagement with the drill bock.

8. A drill bushing guide assembly as in claim 6 wherein the bent portion is in engagement with the drill block.

9. A drill bushing guide assembly as in claim 1 wherein there is a spacing collar on the extension in axial alignment with the hole, said collar being adapted to engage the drill block whereby to space the exit end of the sleeve from the drill block.

* * * * *